United States Patent [19]
McKelvey

[11] 3,733,664
[45] May 22, 1973

[54] CUTTING INSERT
[75] Inventor: Richard E. McKelvey, Latrobe, Pa.
[73] Assignee: Kennametal Inc., Latrobe, Pa.
[22] Filed: Nov. 23, 1971
[21] Appl. No.: 201,366

[52] U.S. Cl. ..................................................29/95
[51] Int. Cl. ..............................................B26d 1/00
[58] Field of Search.................................29/95, 96

[56] References Cited
UNITED STATES PATENTS 3,399,442   9/1968   Jones et al.................................29/95
3,381,349   5/1968   Newcomer..............................29/96
3,557,416   1/1971   Jones.........................................29/95

Primary Examiner—Leonidas Vlachos
Attorney—Melvin A. Crosby

[57] ABSTRACT

The present invention is drawn to an indexable cutting insert having a cutting edge land and a chip controlling groove about the periphery of the cutting face of the said insert in a closed path wherein the transverse width of the groove is varied to provide more favorable chip controlling function when rates and depths of machining feeds are varied with the said insert during operational use.

12 Claims, 7 Drawing Figures

PATENTED MAY 22 1973  3,733,664

CUTTING INSERT

The present invention is concerned with cutting inserts of the type that are referred to as disposable cutting inserts and which are adapted for being detachably mounted on a tool holder for mounting in a machine tool for turning operations. More particularly still, the present invention is concerned with the formation of the cutting edge land area and the chip controlling groove in such an insert.

In turning operations on metals, a ribbon-like strip of metal is taken off from the workpiece as it is being machined. The strip or ribbon, which is thick or thin depending on the feed rate, is cut off from the workpiece at the edge of the cutting insert and control of this ribbon of metals is important for a number of reasons.

In the first place, if the ribbon-like strip of metal taken off from the workpiece by the cutting insert is not broken up it can feed into the tool holder or other portions of the machine adjacent thereto and cause difficulties either by damaging parts of the tool holder or machine tool and by obstructing the visibility of the working area or by becoming entangled in parts of the machine.

Further, long cut off ribbons of this nature are difficult to handle and can represent a safety hazard to the machine operator.

Preferably, the ribbon-like strip of metal taken off from the workpiece is caused to break up into short pieces or chips which will readily fall away from the machining region into a receiving space or container so that the chips are contained and can easily be removed from the machine tool.

Most disposable cutting inserts of the nature referred to and with which the present invention is concerned are today provided with chip controlling grooves extending therealong spaced inwardly a short distance from the cutting edge of the tool. These grooves are effective for causing the ribbon-like strip of metal taken off from the workpiece to bend and break and to fall away from the cutting tool. While chip controlling grooves or chip breakers, as they are sometimes referred to, are known, it has been discovered that a chip controlling or chip breaker groove of uniform cross section, as such grooves have up to now been made, does not meet all machining conditions.

Heretofore, the chip controlling or chip breaker grooves in an insert have been of uniform size and configuration and have thus been defective with respect to controlling or breaking the ribbon of metal taken off under all cutting conditions. For example, a light cut on a workpiece will require one type of chip controlling or chip breaker groove whereas a heavier cut taken on a workpiece will require a chip controlling or chip breaker groove of another nature.

It has been discovered, by considerable testing and experimentation, that a cutting insert of the nature referred to can be provided with a chip controlling or chip breaker groove of the nature referred to, which will meet most machining conditions encountered, by forming the groove to a variable width so that, as the depth of cut taken by the insert increases, the configuration of the chip controlling or chip breaker groove encountered by the ribbon of metal taken off from the workpiece by the insert will change and efficient control of the ribbon of metal taken off from the workpiece will be maintained.

Cutting inserts of the nature referred to are generally made of extremely hard material, for example, cemented tungsten carbide and the chip controlling or chip breaking grooves are formed therein during the molding process. Since such material is substantially unmachinable after it has been sintered, it is important for the insert to be so formed at the time of its manufacture that it is as widely adaptable as possible because no substantial change in the configuration thereof can be made with any degree of economy after the said sintering operation.

An insert of the type having a groove formed therein in such a manner that either one or the other or both of the land area outside the groove and the groove vary in width while the groove itself varies in depth as disclosed in the Galimberti et al. U.S. Pat. No. 3,383,748, and assigned to the same assignee as the present invention. The insert of the aforementioned patent, while highly efficient in meeting various cutting conditions, is, nevertheless, somewhat complicated and expensive to manufacture.

With the foregoing in mind, it is a primary objective of the present invention to provide a cutting insert having a chip controlling or chip breaker groove formed therein which adapts the cutting insert automatically to varying machining conditions.

Still another object of the present invention is the provision of a chip controlling or chip breaking groove in a cutting insert which will provide for different type of controls of the ribbon of metal taken from a workpiece by the cutting insert at different feed rates.

A particular object of the present invention is the provision of a cutting insert of the nature referred to in which improved operating characteristics of the cutting insert is had without substantially increasing the cost of manufacture of the insert.

A still further object of the present invention is a provision of a cutting insert so formed as to be adaptable to different cutting conditions but being relatively inexpensive to manufacture.

The foregoing objects as well as still other objects and advantages of the present invention will become more apparent upon reference to the following detailed specification taken in connection with the accompanying drawings in which.

Figure 1:
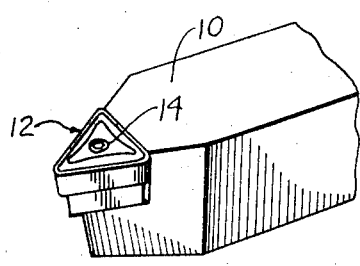
FIG. 1 is a perspective view showing a tool holder with a disposable cutting insert according to the present invention mounted thereon.

DETAILED DESCRIPTION OF THE INVENTION:

Referring to the drawings somewhat more in detail, in FIG. 1, reference numeral 10 represents a tool holder adapted for being clamped in the carriage or other support provided therefor in a machine tool. Tool holder 10 has a shaped notch or recess in one end in which is disposed a removeable cutting insert 12 which, as mentioned, is preferably made of an extremely hard material such as cemented tungsten carbide.

The insert may be clamped in place by a hold down clamp element on the holder bearing or top of the insert or it may be provided with a central hole 14 into which an adjustable clamping member on the tool holder extends. The particular clamping arrangement is not illustrated in FIG. 1, but it will be understood that it can be any of several well known types which provide for securely holding the insert 12 down on the tool holder and against the surfaces of the notch of the recess provided in the tool holder for receiving the insert.

Figure 2:
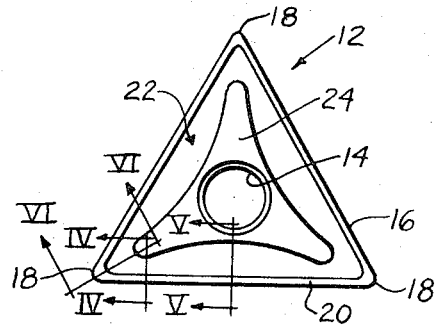
FIG. 2 is a plan view drawn at increased scale showing a triangular cutting insert according to the present invention.
Figure 3:
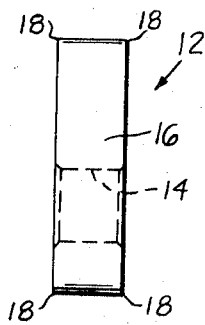
FIG. 3 is a side view of the insert of FIG. 2.
Figure 4:
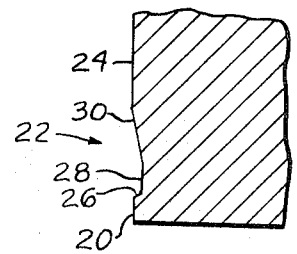
FIGS. 4, 5 and 6 are sectional views of the insert of FIG. 2 and are indicated, respectively, by section lines IV—IV, V—V, and VI—VI on FIG. 2.
Figure 5:
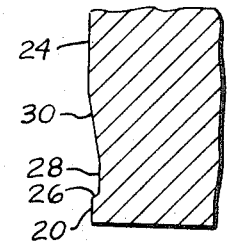
Figure 6:
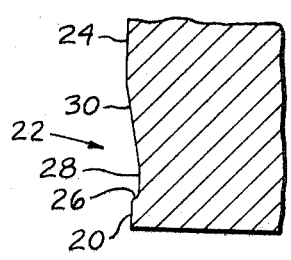

The insert 12 of FIG. 1 is shown drawn at enlarged scale in FIG. 2 wherein it will be seen to comprise a body 16 of cemented tungsten carbide having flat parallel top and bottom faces and in the form of a triangle in plan view and having rounded corners or noses at 18. The insert has a peripheral surface which extends between the top and bottom faces and forms sharp edges therewith.

The insert has a flat cutting edge land area 20 extending completely thereabout and immediately inwardly of cutting edge land area 20 is the chip controlling or chip breaking groove 22 according to the present invention. Inwardly of groove 22 is an island area 24 which provides the principal surface on which the insert rests in the tool holder 10. Island area 24 on top of the insert is also engaged by a clamp member when the insert is clamped to the tool holder 10 by a clamp element which does not extend through the aforementioned central hole 14.

As will be seen, particularly in FIGS. 2 and 4 through 6, the land area 20 is substantially uniform in width throughout the entire length thereof. The land area is defined by the one side wall portion 26 of the groove in the insert and which side wall portion is in the form of a fillet concave away from the insert and intersecting the plane of the adjacent face of the insert at a steep angle.

Extending toward the center of the insert from the lower end of fillet 26 which forms the one wall portion of the groove is a bottom wall portion 28 which, similarly to the land area 20, is substantially uniform in thickness along the entire length of the grove.

From the back edge of the bottom wall portion 28 is the other wall portion of the insert 30, and this is in the form of an incline leading from the edge of the bottom wall portion nearest the center of the insert upwardly at an angle and intersecting the plane of the adjacent face of the insert.

The included angle between incline 30 and the plane of the adjacent face of the insert is relatively small and is only about 10 to 12 degrees at the maximum. The angle of the incline 30 varies from a steepest part at each corner of the insert toward a less steep portion midway between the corners of the insert.

By varying the inclination of incline 30, the line where the upper edge of the incline intersects the plane of the adjacent face of the insert is caused to curve as will be seen in FIG. 2 so that the effective width of the groove increases from each corner of the insert toward a point midway between the corners. The depth of the groove, however, remains constant and, likewise, the width of the land area remains constant as does the configuration of wall portion 26 of the groove.

The insert formed in the described manner is quite easy to manufacture because molds therefor can be made relatively simply, and the compacting of the powders in the molds become simplified because there is a minimum change in section of the insert from place to place. The insert can, thus, readily be pressed to a desired configuration and will have substantially uniform density and will also have uniform density when sintered and thereby shrunk to its final configuration.

The insert disclosed and described up to this point is triangular with three corners thereon, but FIG. 8 shows an insert 32 which is square and has four corners thereon. In either case, the corners of the insert are smoothly rounded as indicated at 34, and the opposed wall portions of the groove means are also smoothly curved at the corners thereby maintaining the land area at the same width around the entire insert while the groove in the insert is most narrow directly at the corners of the insert.

The insert can be formed with a groove in only one face, but it is preferable to form grooves in both the top and bottom faces thereof whereby the insert becomes not only indexable to present the corners of one face thereof one after the other to the work, but it is also invertable so that the corners on the other face can also be presented to the work sequentially.

Figure 7:
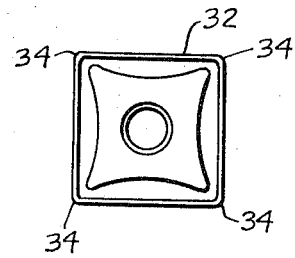
FIG. 7 is a plan view showing an insert of a different shape.

Thus, a triangular insert with grooves in both faces has six useable corners and a square insert as shown in FIG. 7 has eight useable working corners thereon.

In both cases, the land area and groove present proper conditions for taking light cuts in which only the portion of the insert at and near the corners employed up to taking fairly heavy cuts, in which case almost half the length of one side edge of an insert might be used in the cutting operation.

Modifications may be made within the scope of the appended claims.

What is claimed is:

1. In a cutting insert; a body having parallel planar top and bottom faces and a peripheral wall extending between said faces at right angles thereto and forming edges therewith, said body when viewed in a direction perpendicular to a said face thereof being polygonal whereby said body has circumferentially spaced corners at the junctures of said edges, and groove means formed into at least one of said faces and extending in a closed path about the respective said face, said groove means intersecting the plane of the respective face of the body on the side of the groove means nearest the said peripheral wall of the body along a line parallel to and spaced from the said edges of the body, the other side of said groove means intersecting said plane of the respective face of the body along a line which curves so the groove means is narrowest at the said corners of the body and widest intermediate said corners, said groove means being of uniform depth throughout the length thereof.

2. A cutting insert according to claim 1 in which the said line at the side of said groove means nearest said peripheral wall is spaced the same distance from each of the said edges of the body.

3. A cutting insert according to claim 1 in which the groove means on the side nearest said peripheral wall has one side wall portion making a large angle with the plane of the respective face of the body and on the opposite side has another side wall portion making a small angle with the plane of the respective face of the body.

4. A cutting insert according to claim 3 in which said groove means includes a bottom wall portion substantially parallel with the respective face of the body and extending between the said side wall portions at the bottom thereof.

5. A cutting insert according to claim 4 in which said one side wall portion is in the form of a fillet.

6. A cutting insert according to claim 4 in which said other side wall portion is in the form of an incline.

7. A cutting insert according to claim 4 in which said bottom wall is substantially uniform in width throughout the length of said groove means.

8. A cutting insert according to claim 7 in which said one side wall portion is in the form of a fillet leading from said bottom wall portion to the respective face of the insert and concave away from said body, and said other side wall portion is in the form of an incline leading from said bottom wall portion to said respective face of the body.

9. A cutting insert according to claim 8 in which the inclination of said incline is steepest at the corners of said body and decreases in steepness from each corner of the insert toward points intermediate the corners.

10. A cutting insert according to claim 9 in which said incline at the steepest part thereof forms an angle of about 12 degrees with the plane of the respective face of the body.

11. A cutting insert according to claim 1 in which said groove means comprises a groove in each face of said body.

12. A cutting insert according to claim 1 in which the said corners of said body are smoothly rounded and the opposite sides of said groove means are also smoothly rounded at said corners of said body.

* * * * *